United States Patent [19]

Hammerle et al.

[11] Patent Number: 4,794,210

[45] Date of Patent: Dec. 27, 1988

[54] REVERSING SWITCH ASSEMBLY FOR AN ELECTRIC ASSIST STEERING SYSTEM

[75] Inventors: Frederick A. Hammerle, Topsfield, Mass.; Richard Wiciel, Kingston, N.H.; James A. Mallett, East Milton, Mass.

[73] Assignee: TRW Inc., Lyndhurst, Ohio

[21] Appl. No.: 79,882

[22] Filed: Jul. 30, 1987

[51] Int. Cl.⁴ .......................... H01H 9/00; B62D 5/04
[52] U.S. Cl. .................................. 200/1 V; 180/79.1; 200/18; 200/68.2
[58] Field of Search ............... 180/79.1, 142; 318/2; 200/1 R, 1 V, 5 R, 6 R, 6 B, 6 BA, 6 BB, 17 R, 18, 153 L, 153 T, 153 V, 68.1, 68.2, 68.3, 61.39, 153 N

[56] References Cited

U.S. PATENT DOCUMENTS

| | | | |
|---|---|---|---|
| 706,804 | 8/1902 | Moskowitz | 441/26 |
| 3,192,329 | 6/1965 | Murrle | 200/16 A |
| 3,322,914 | 5/1967 | Puccini | 200/68.2 X |
| 3,983,953 | 10/1976 | Bayle | 180/79.1 |
| 4,223,254 | 9/1980 | Adams | 318/2 |
| 4,254,310 | 3/1981 | Kirchoff et al. | 200/68.2 X |
| 4,408,105 | 10/1983 | Tanaka | 200/68.2 |
| 4,415,054 | 11/1983 | Drutchas | 180/79.1 |
| 4,458,116 | 7/1984 | Kenny et al. | 200/153 L |
| 4,598,787 | 7/1986 | Drutchas | 180/79.1 |

Primary Examiner—J. R. Scott
Attorney, Agent, or Firm—Tarolli, Sundheim & Covell

[57] ABSTRACT

A switch for controlling the current to an electric motor is disclosed. The switch includes first and second parts which are relatively rotatable about a first axis. The switch also includes contacts which are actuatable to permit electrical power to be applied to the motor in a direction depending upon the direction of relative rotation between the first and second parts. A portion of the contacts are carried by a rocker arm pivotally mounted against one of the parts with cooperating contacts mounted to the one part. Actuation of the contacts is controlled by an associated pivoting member located radially outward of the first axis and pivotable about a second axis, transversely to the first axis. The pivoting member carries a roller slidably mounted to an end thereof and resiliently biased against the rocker arm. The roller is of sufficient diameter to contact the rocker arm at two locations when the switch is in a neutral condition with all of the electrical contacts open. Relative rotation between the first and second parts causes the pivot member to pivot which, in turn, causes the rocker arm to pivot and close a set of contacts.

24 Claims, 5 Drawing Sheets

REVERSING SWITCH ASSEMBLY FOR AN ELECTRIC ASSIST STEERING SYSTEM

BACKGROUND OF THE INVENTION

FIELD OF THE INVENTION

The present invention relates to an apparatus for switchably controlling the application of electrical power to an electric motor, and particularly relates to an electric switch for controlling the application of electrical power to an electric motor for providing power assist in a vehicle steering system.

BACKGROUND ART

Electric power assist vehicle steering systems are known. Examples of electric power assist vehicle steering systems are described in U.S. Pat. Nos. 3,983,953 and 4,415,054.

In U.S. Pat. No. 3,983,953, an electric motor is energized in response to torque applied to the vehicle steering wheel. When the steering wheel is rotated, a torque sensitive switch closes and the electric motor is actuated. The electric motor, when actuated, applies a drive force to assist the driver in steering the vehicle.

In one embodiment of the '953 patent, two coaxial steering shaft sections are mounted for relative rotation. Two spaced-apart "direction" contacts are fixed to one shaft section. A contact arm is fixed to the other shaft section and is positioned between the direction contacts. When sufficient relative rotation occurs ee-tween the two shaft sections, the contact arm engages one of the direction contacts. A control computer monitors the switch condition and controls an electric assist motor in response to closing of the switch. In another embodiment of the '953 patent, a reveriing switch is operatively connected across the two coaxial shaft sections. Sufficient relative rotation between the shaft sections causes switch closure and electrical power to be applied to the motor in a direction depending upon the steering direction.

U.S. Pat. No. 4,415,054 discloses an electric steering assist motor having a rotatable armature encircling a force transmitting member. Rotation of the armature causes linear movement of the force transmitting member. The electric motor is energized to drive the force transmitting member in a direction corresponding to the direction of rotation of the vehicle steering wheel.

In particular, a steering system in accordance with the '054 patent includes a steering column having two coaxial shaft sections which are mounted for relative rotation and are coupled axially together through a torsion bar. A Hall effect position sensor is operatively coupled across the two shaft sections. An electric signal is produced by the Hall effect position sensor proportional to the amount of relative rotation between the shaft sections and the direction of relative rotation. The electric signal from the Hall effect position sensor is used by an electronic control unit to control energization of the electric assist motor.

Some of the known electric power assist systems that have utilized reversing switches to connect an electrical power source to an electric assist motor have required a relatively large amount of rotational movement between two coaxial shaft sections to actuate or close the switch contacts. This results in a different "steering feel" than vehicle operators have become accustomed to with mechanical or hydraulic power assist steering systems. Some of the known systems have also required precise machining, assembly and adjustment to insure that the switches properly control the application of electric power to the assist motor.

To improve the "steering feel," it is desirable to improve the switching assembly that connects a power source to the electric assist motor. The switch assembly desirably requires a relatively small amount of relative rotation between two coaxial shaft sections to accomplish switch closure without increasing the space required to house the assembly. The assembly also desirably permits continued rotation between the two shaft sections even after the switch closure occurs.

One reversing switch assembly is disclosed in U.S. Pat. No. 4,598,787 to Drutchas which is assigned to the assignee of the present application. The '787 patent discloses an electric power assist steering system including a reversing switch assembly operatively coupled across two coaxial steering shaft sections for controlling the application of electric power to an electric assist motor. A position sensor is also coupled across the shaft sections for producing an electric signal proportional to the relative rotation between the shaft sections. The system is designed so that no electric potential is available to be applied to the electric assist motor until a sufficient amount of relative rotation occurs between the two shaft sections to insure closure of the reversing switch.

Cam surfaces are fixed to one of the shaft sections and cam followers are pivotally supported by the other shaft section. Each of the cam followers includes a pair of arms, each of which carries an electrical contact. Upon a sufficient amount of relative rotation between the shaft sections, the cam surface pivots the cam followers to close an electrical circuit. The direction in which electrical power applied to the power assist motor is controlled by the direction of relative rotation between the shafts. The amount of relative rotation between the shaft sections required to insure switch closure in the switch assembly of the '787 patent is relatively small compared to known prior designs

SUMMARY OF THE INVENTION

The present invention is directed to a switch assembly particularly for use in a power steering system having an electric assist motor drivingly connected to a steering member of a vehicle. The present invention provides a reversing switch for controlling the application of electric power to the assist motor, which, in turn, controls the direction the assist motor drives the steering member. The reversing switch assembly, in accordance with the present invention, multiplies the effect of any relative rotation between the two coaxial steering shaft sections and uses this multiplied effect to control switch closure. The switch assembly requires little or no increase in the space required to house the switch assembly. The switch assembly of the present invention minimizes the need for close machining tolerances, precise assembly and adjustment. The switch assembly of the present invention permits continued relative rotation of the shaft sections after the switch contacts close.

In accordance with the present invention, a reversing switch assembly is operatively coupled across two coaxial steering shaft sections which are relatively rotatable about a first axis. Contacts of the switch assembly are actuatable to connect an electric power source to the assist motor. Some of the contacts are actuated in response to relative rotation of the two shaft sections in a first direction to permit actuation of the electric assist motor in one steering direction. Some others of the contacts of the switch assembly are actuated in response to relative rotation of the two shaft sections in a second opposite direction to permit actuation of the electric assist motor in an opposite steering direction. The contacts of the switch assembly are actuated by pivoting means located radially outward of the first axis. The pivoting means pivots about a second axis whch is transverse to the first axis.

The reversing switch, in accordance with a preferred embodiment of the present invention, includes four terminals which are disposed in a circular array about two coaxial steering shaft sections. A first terminal is connected to one terminal of the motor. A second terminal is disposed diametrically opposite of the first terminal and is connected to another terminal of the motor. A third terminal, is connected to one terminal of a power source. A fourth terminal is disposed diametrically opposite the third terminal and is connected to another terminal of the power source.

The reversing switch also includes four normally open contact pairs disposed between adjacent pairs of the switch terminals. The contact pairs close upon actuation to electrically connect two of the switch terminals. Selectively closing two of the contact pairs establishes which one of two circuits electrically connects the motor with the power source.

A direction sensing mechanism selectively closes contact pairs in response to relative rotation of the two shaft sections. The direction sensing mechanism includes a first body portion fixed to one shaft section. A second body portion is fixed to the other shaft section. The direction sensing mechanism also includes a pair of pivoting means located radially outward of the shaft sections.

Each of the pivoting means is supported by the second body portion for pivotal movement about a second axis. The second axis is transverse to the first axis. Each of the pivoting means has a first portion which engages the first body portion to effect pivotal movement of the pivoting means upon relative rotation of the too shaft sections. A second portion of each of the pivoting means includes means which engages a respective arm to close a contact pair upon pivotal movement of the pivoting means.

BRIEF DESCRIPTION OF THE DRAWINGS

Further features and advantages of the present invention will become apparent to those skilled in the art to which the present invention relates from a reading of the following specification made with reference to the accompanying drawings in which.

DESCRIPTION OF A PREFERRED EMBODIMENT

Figure 1:
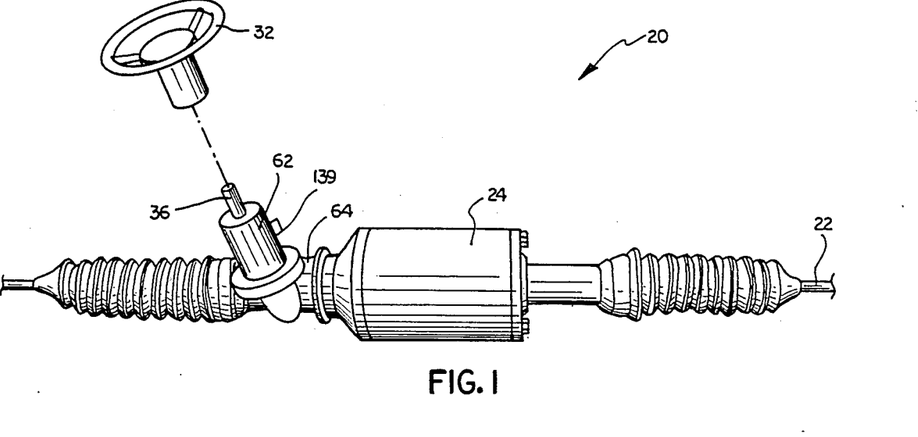
FIG. 1 is a perspective view of an electric power assist steering system incorporating a reversing switch of the present invention.

Referring to FIG. 1, an electric power assist steering system 20 for use in an automotive vehicle includes a steering member 22 operatively connected to steerable wheels (not shown) in a known manner. An electric assist motor 24 encircles and is drivingly connected with the steering member 22. The arrangement of the electric assist motor 24 and the steering mebber 22 is fully described in U.S. Pat. No. 4,415,054 to Drutchas which is hereby fully incorporated herein by reference.

The electric assist motor 24 is a reversible, permanent magnet, D.C. motor which rotates in a direction depending upon the magnitude and direction of current flow through the windings of the motor armature. The motor 24 is used to assist the movement of the steering member 22 in a given direction upon application of electric current to the armature of the motor in an appropriate direction.

Figure 3:
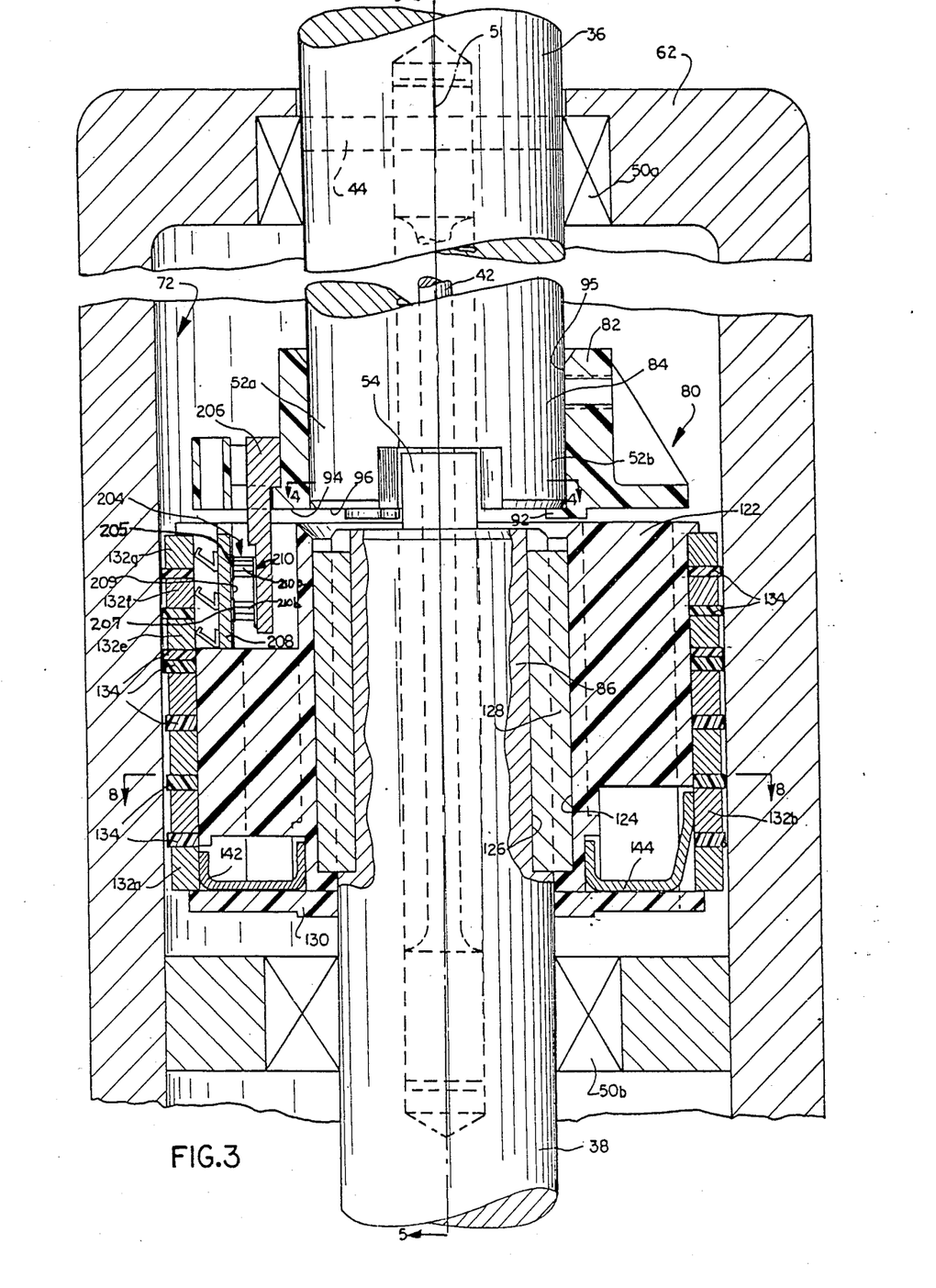
FIG. 3 is a cross sectional view of the reversing switch of the present invention.

The steering system 20 includes a steering wheel 32 drivingly connected with an input shaft 36 in a known manner. Referring to FIG. 3, the input shaft 36 is drivingly connected with an output shaft 38 by a resilient member, such as a torsion bar 42. The torsion bar 42 is received in a coaxial bore in the input shaft 36 and is connected with the input shaft by pin 44. The other end portion of the, torsion bar 42 is received in a coaxial bore in the output shaft 38 and is secured thereto by a friction fit. The input shaft 36 and the output shaft 38 are coaxial. The torsion bar 42 resists relative rotation between the input shaft 36 and output shaft 38.

Figures 4, 8:
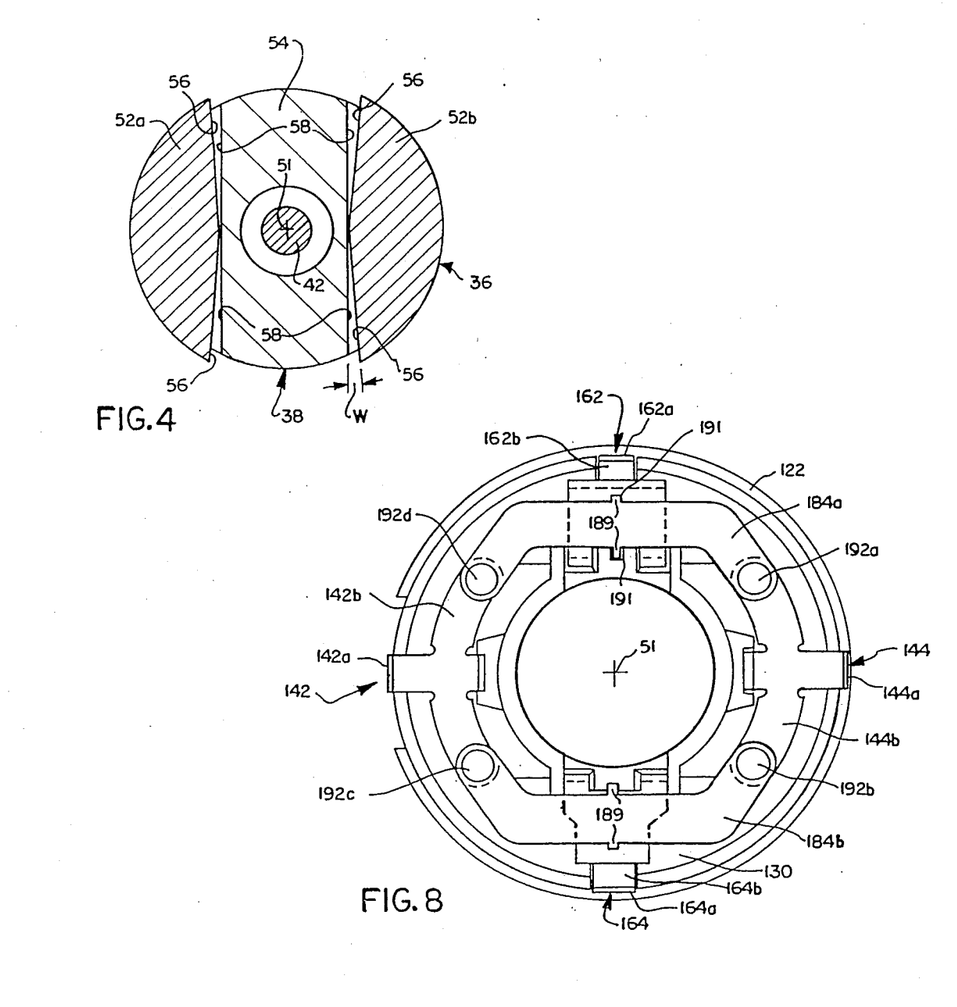
FIG. 4 is a cross sectional view taken approximately along the line 4—4 of FIG. 3.
FIG. 8 is a view taken approximately along the line 8—8 of FIG. 3 with some parts removed for clarity.

The input shaft 36 has two projections 52a, 52b extending axially from an end portion 84. The output shaft 38 has a central projection 54 extending axially from an end portion 86. Referring to FIG. 4, the input shaft projections 52a, 52b and 54 interact to limit the amount of relative rotation between the input and output shafts 36, 38. The projections 52a, 52b have interior faces 56 which are formed at an angle W relative to exterior faces 58 of the output shaft projection 54. In the preferred embodiment, this angle W is 4°. It is contemplated that other angles may be used. Relative rotation between the input shaft 36 and output shaft 38 is limited to 4° in either direction from a relative neutral position, as illustrated in FIG. 4.

During steering, a vehicle operator rotates the steering wheel 32 which causes the input shaft 36 to rotate. If there is little resistance to turning by the steerable wheels, the input shaft 36 and output shaft 38 rotate together because they are drivingly connected by the torsion bar 42. When the steerable wheels encounter a greater resistance to turning, more torque must be applied to the steering wheel 32 to effect steering. This torque causes the input shaft 36 to rotate relative to the output shaft 38. If sufficient torque is applied to cause the surfaces 56, 58 to engage, the input shaft 36 and output shaft 38 are thereafter, mechanically coupled together and rotate together.

Figure 5:
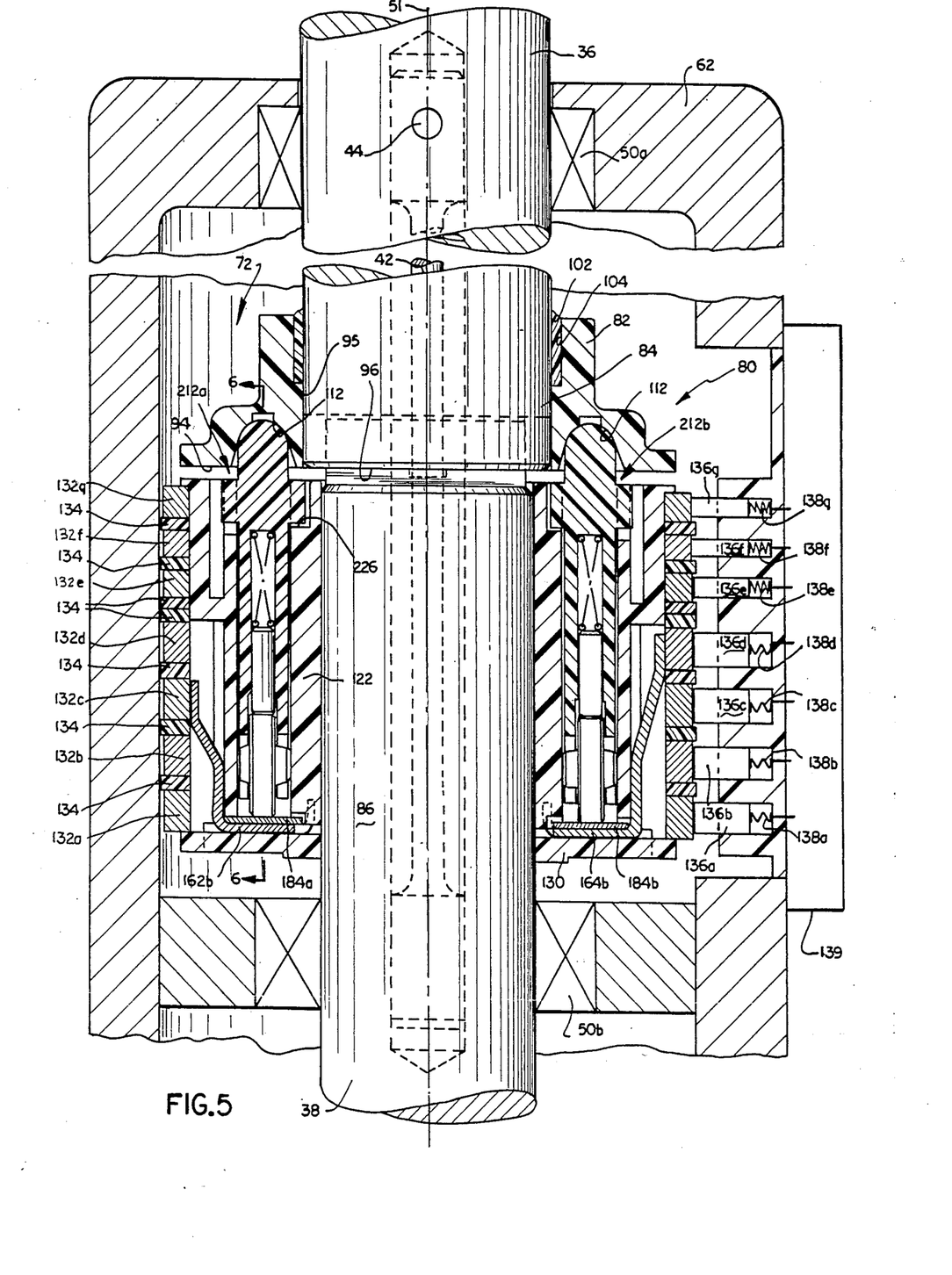
FIG. 5 is a cross sectional view taken approximately along the line 5—5 of FIG. 3.

Referring to FIGS. 1, 3 and 5, a tower housing 62 is integrally formed with a housing member 64 which surrounds the steering member 22. The shaft end portions 84, 86 are located within a chamber 72 in the tower housing 62. The tower housing 62 supports two spaced apart bearings 50a, 50b. The input shaft 36 and output shaft 38 are coaxially supported by a respective bearing 50a, 50b for rotation about a first axis 51.

A reversing switch assembly 80 is also located in the chamber 72 and operatively coupled to the input shaft 36 and the output shaft 38 to control the application of electrical power to the assist motor 24 in a direction responsive to the direction of applied steering torque to the steering wheel 32. The switch 80 includes a first body portion 82 which circumferentially surrounds the end portion 84 of the input shaft 36. The first body portion 82 is constructed from an electrically non-conductive material. Three tangs 92 (only one shown) are circumferentially spaced about an end surface 94 of the first body portion 82 and partially extend into a bore 95 of the first body portion 82. The tangs 92 constrain the end surface 94 of the first body portion 82 from moving axially upward, as viewed in FIGS. 3 and 5, relative to the end surface 96 of the input shaft 36.

The first body portion 82 is fixed to the input shaft 36 using adhesive. Specifically, adhesive bonding 102 is applied into a pair of slots 104 which are circumferentially spaced about the bore 95 of the first body portion 82. Also, the inner surface of bore 95 has axial serrations. The bore 95 is dimensioned to be in a friction fit with the input shaft 36. The combination of the adhesive bond and friction fit prevents the first body portion 82 from moving axially downward as viewed in FIGS. 3 and 5, along the input shaft 36 and from rotating relative to the input shaft.

The first body portion 82 also includes a pair of surfaces which define two recesses 112 extending axially into the first body portion from the end surface 94. The recesses 112 are preferrably disposed diametrically opposite one another. The function of the recesses 112 is explained below.

The switch assembly 80 also includes a second body portion 122 of a generally cylindrical configuration which circumferentially surrounds, and is fixed to, the end portion 86 of the output shaft 38. The second body portion 122 is disposed axially adjacent the first body portion 82. The second body portion 122 is constructed of an electrically nonconductive material.

The second body portion 122 has a pair of longitudinally extending grooves 124. The output shaft 38 also has a pair of longitudinally extending grooves 126. The pairs of grooves 124, 126 are disposed adjacent one another and receive keys 128 therein to prevent relative rotation of the second body portion 122 and the output shaft 38. Also, the inner surface of the bore in the second body portion 122 has axial serrations and is dimensioned to be in a friction fit with the output shaft 38. Since the first and second body portions 82, 122 are fixed to shafts 36, 38 respectively, the body portions are relatively rotatable along with the shafts.

Figure 6:
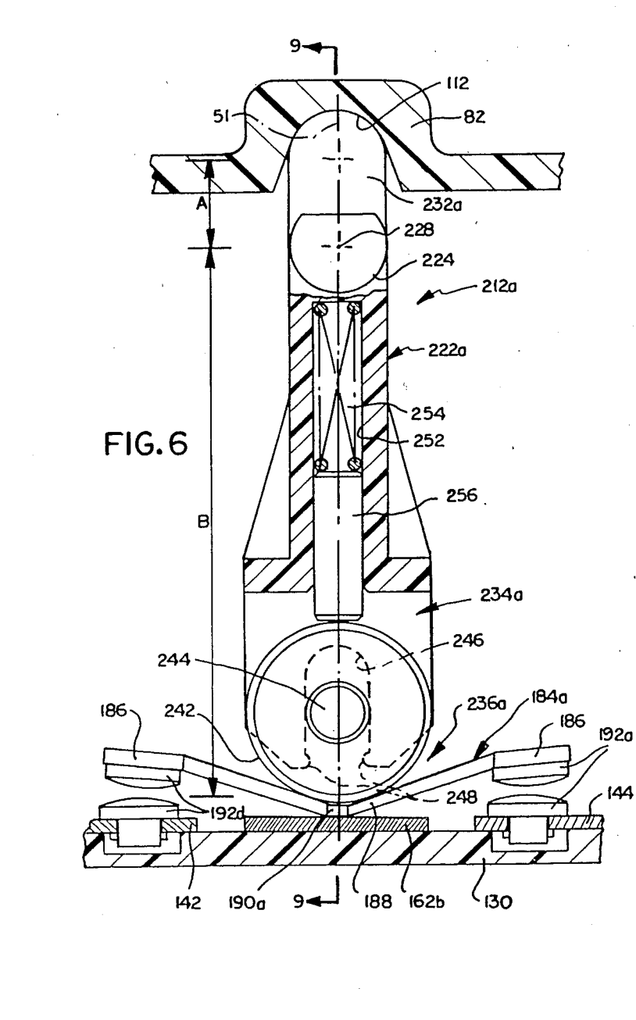
FIGS. 6 is a view, partly in section taken approximately along the line 6—6 of FIG. 5.

Referring to FIGS. 5, 6, 8 and 9, the switch assembly 80 further includes an identical pair of electrically conductive rocker arms 184a, 184b. Each of the rocker arms 184a, 184b includes leg portions 188 connected by a flat contact portion 190. The leg portions 188 are arranged in a V-shape with the leg portions being separated by a predetermined angle. The distal end of the leg portions 188 each carry an arm portion 186. The flat contact portion 190 of each rocker arm 184a, 184b rests on a respective terminal support 162b, 164b. The rocker arms 184a, 184b pivot in planes parallel with the first axis 51 about the respective flat contact portions 190 (FIG. 6). The flat contact portion 190 includes a pair of tangs 189 extending outwardly therefrom to engage recesses 191 in the second housing part 122 to prevent rotation of the rocker arms 184 in a plane transverse to the first axis 51. One part of a contact pair 192 is fixed to a respective end arm portion 186 of the rocker arms 184a, 184b.

The switch assembly 80 further includes two identical pivoting arms 212a, 212b. Each of the pivoting arms 212a, 212b is used to pivot a respective rocker arm 184 to pivot in one direction or another in response to relative rotation of the input and output shafts 36, 38. Each of the pivoting arms 212a, 212b includes an elongated member 222. The elongated member 222 has a support portion 224. The support portion 224 is basically a stub shaft which is supported in recesses 226 of the second body portion 122. The support portion 224 supports the pivoting arms 212a, 212b for pivotal movement about an axis 228. The axis 228 is transverse to the first axis 51.

Each of the pivoting arms 212a, 212b also includes an end portion 232 which extends upwardly, as viewed in FIG. 6, from the support portion 224. The first portion 232 is generally cylindrical and has a hemispherical end. The first portion 232 fits into the recess 112 of the first body portion 82 and is movable therewith. Thus, as the first body portion 82 rotates relative to the second body portion 122, the first portion 232 of the pivoting arm causes the pivoting arms 212a, 212b to each pivot about the axis 228. The direction of pivoting movement of the pivoting arms 212a, 212b depends upon the direction of relative rotation of the first and second body portions 82, 122. The length of the lever arm created by the first portion 232 engaging the recess 112 and pivoting about the second axis 228 is indicated by the dimension A in FIG. 6.

Each of the pivoting arms 212a, 212b also includes a second portion 234 which has a sliding wheel arrangement 236 for engaging and pivoting a respective rocker arm 184a, 184b. The sliding wheel arrangement 236 includes a wheel 242 supported for rotation by shaft 244. The shaft 244 is supported for sliding movement along the longitudinal axis of the member 222 in a slot 246. Tabs 248 are located at the end of the slot 246 to prevent the wheel 242 from separating from the member 222 during assembly and handling.

A bore 252 extends coaxially through a portion of the member 222. Located within the bore 252 are a spring 254 and a push rod 256. The push rod 256 engages the wheel 242 and the spring 254. The spring 254 engages the closed end of the bore 252 and exerts a biasing force on the push rod 256. The wheel 242 is thus spring biased into engagement with the rocker arm 184a so that rolling contact can be maintained between the wheel and rocker arm during pivotal movement of the rocker arm and pivoting arm 212a.

The diameter of the wheel 242 is selected as a function of the angular separation of the leg portions 188 of the rocker arm 184. The diameter of wheel 242 is sufficient so as to provide a two-point contact between the wheel 242 and the rocker arm 184 when the pivot arm 212 is in a no torque condition as is shown in FIG. 6, i.e., the wheel 242 is in contact with each of the two leg portions 188 of the rocker arm 184. This two-point contact between the wheel 242 and the rocker arm 184 in combination with the flat portion 190 being in contact with portion 162b, 164b provides switch stability when there is no relative rotation between input shaft 36 and output shaft 38. The use of spring 254 in pivoting arm 222 forces the upper portion of the arm 232 in contiguous engagement with surface 112 of the first body portion 82 while also forcing tee wheel 242 to be in engagement with rockers 184 thereby limiting both contact bounce and any free motion of arm 232 relative to surface 112.

The length of the lever arm created by the second portion 234 engaging a rocker arm 184 and pivoting about the second axis 228 is indicated by the dimension B. The ratio of B to A is greater than 1:1, and is illustrated as being approximately 4:1, to create a multiplier effect. The multiplier effect results in the axis of the wheel 242 moving a larger arcuate distance than the center of the hemisphere of the first portion 232. Also, the recesses 112 are radially spaced from the first axis 51. This radial spacing gives a multiplying effect to relative rotation of the two shaft sections 36, 38 because of the larger arcuate distance the recess 112 moves than the center of the shafts 36, 38. The present invention, therefore, provides for a double multiplying effect to relative rotation of the shafts 36, 38. Thus, only a relatively small amount of relative rotation of shafts 36, 38 is required to pivot the rocker arms 184.

Referring again to FIGS. 3 and 5, the switch assembly 80 also includes seven electrically conductive annular, slip rings 132 axially spaced about the outer periphery of the second body portion 122 and are rotatable therewith. The rings 132 are separated by seven spacers 134. The spacers 134 are made from an electrically nonconductive material. The conductor rings 132 are each engaged by a respective electrically conductive brush 136. Each of the brushes 136 is biased into engagement with an associated conductor ring 132 by an associated spring 138. The ring and brush arrangement permit electrical connections to exterior devices through a brush box connector 139.

Figure 2:
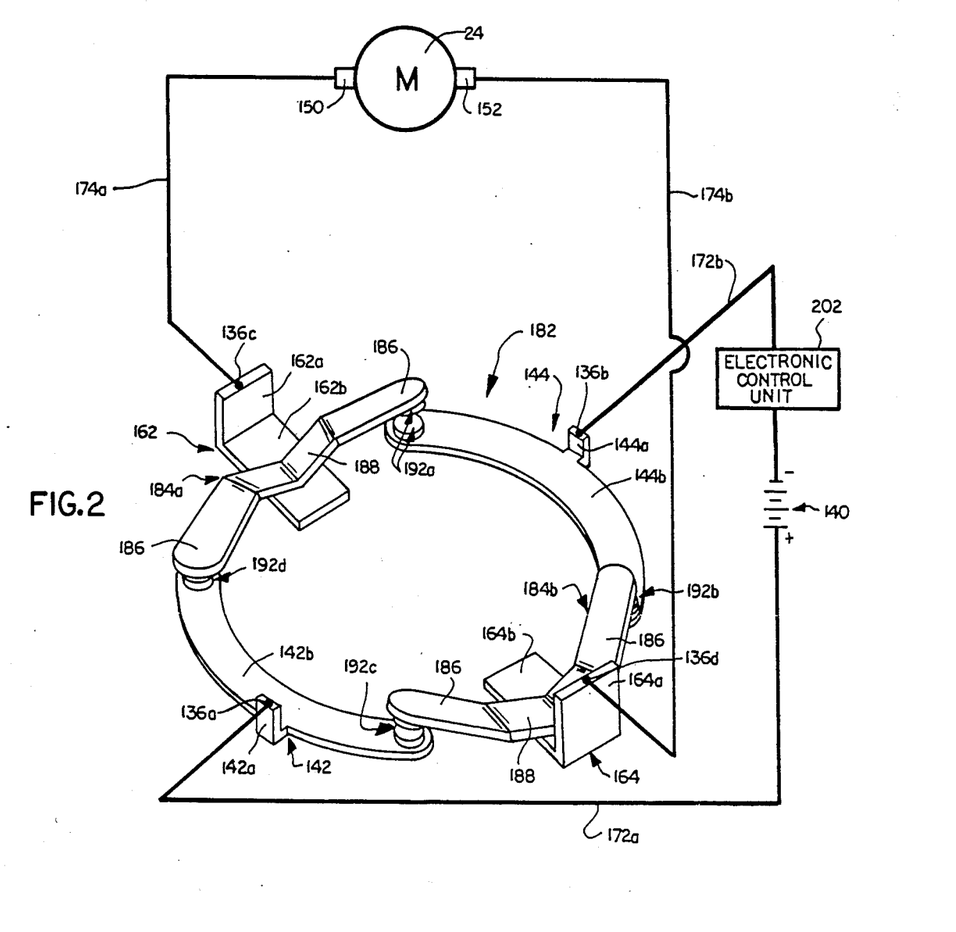
FIG. 2 is a schematic illustration showing a portion of the reversing switch of the present invention.

Referring to FIGS. 2, 3 and 5, brush 136a is connected with the positive voltage side of a vehicle power supply 140, such as a battery. Brush 136a is urged into engagement with the exterior of the conductor ring 132a by spring 138a to maintain an electrical connection therebetween. A power terminal 142 engages the interior of the conductor ring 132a for electrical connection therebetween.

Brush 136b is electrically connected with an electronic control unit ("ECU") 202 which is connected with the negative terminal of the power supply 140. Brush 136b is urged into contact with the exterior of the conductor ring 132b by spring 138b. Conductor ring 132b interior engages a power terminal 144.

The power terminals 142, 144 are formed from an electrically conductive material, such as metal. The power terminals 142, 144 (FIG. 8) have a ring contact portion 142a, 144a, respectively, and an arcuate portion 142b, 144b, respectively. The contact portions 142a, 144a are integrally formed with and extend transversely from the respective arcuate portions 142b, 144b. The arcuate portions 142b, 144b are supported in the second body portion 122 by an end cap 130. Ends of the arcuate portions 142b, 144b support respective other parts of the contact pairs 192.

Brush 136c is electrically connected with a motor terminal 150. Brush 136c is urged into engagement with the exterior of the conductor ring 132c by spring 138c. The conductor ring 132c also engages a switch terminal 162.

Brush 136d is connected with the other motor terminal 152. Brush 136d is urged into engagement with the exterior of the conductor ring 132d by spring 138d. Conductor ring 132d also engages a switch terminal 164.

The switch terminals 162, 164 are formed from an electrically conductive material, such as metal. The switch terminals have a respective contact portion 162a, 164a and a respective support portion 162b, 164b extending transversely therefrom. The support portions 162b, 164b are supported in the second body portion 122 by the end cap 130.

Brushes 136e, 136f, 136g (FIG. 5) are electrically connected with the ECU 202. The brushes 136e, 136f, 136g respectively engage conductor rings 132e, 132f, 132g. The conductor rings 132e, 132f 132g are electrically connected to a position sensor 204 (FIG. 3). The position sensor 204, in accordance with a preferred embodiment of the present invention, includes a ceramic substrate 208 fixed to the second body portion 122. A resistive strip 205 is secured to an inner surface 209 of the substrate 208. The ends of the resistive strip 205 are electrically connected respectively through conductor rings 132e and 132g to a D.C. electrical source. The position sensor 204 further includes a finger member 210 secured to an arm 206 which is, in turn, secured to the first body portion 82. The finger member 210 includes first fingers 210a and second 210b. The fingers 210a, 210b are axially spaced and project radially outward of the axis 51. First fingers 210a slidably and electrically contact the resistive strip 205. A second electrical strip 207 is secured to the inner surface 209 of the substrate 208 and is located so as to be slidably and electrically contacted by the second fingers 210b. The second strip 207 is electrically connected to the conductor ring 132f. When the torsion bar 46 is not twisted, i.e., no relative rotation between the input shaft 36 and the output shaft 38, the finger portion 210a is preferably centered between the ends of the resistive strip 205. The output signal present on conductor ring 132f is a D.C. voltage having a value less than the D.C. voltage applied to the conductor rings 132e, 132g. When relative rotation occurs between the input shaft 36 and output shaft 38, the finger portion 210a slides along the resistive strip 205. The value of the D.C. signal on conductor 132f varies up or down, depending upon the direction of relative rotation, from the D.C. value that was present when no relative rotation occurred between the input shaft 36 and the output shaft 38.

The ECU 202 monitors the voltage present on the conductor ring 132f and controls the current appliable to the motor in response thereto. The control and operation of the ECU 202 in combination with a resistive torque sensor is fully described in the above-mentioned U.S. Pat. No. 4,598,787, which is hereby fully incorporated herein by reference.

The motor armature (not shown) rotates in a direction depending upon the magnitude and direction of current flow therethrough. The armature is drivingly connected with the steering member 22. Rotation of the armature effects the direction in which the steering member moves.

The amount of relative rotation between the shafts 36, 38 controls the amount of power assist supplied from the motor 24. The ECU 202 and the sensor 204 are arranged to insure that the switch 80 is closed before any power is applied to the contacts 192. This prevents arcing between the contacts 192 to prolong switch life. This feature is also fully described in the '787 patent.

The relationship between the terminals 142, 144, 162, 164, the motor 24 and the power source 140 is illustrated schematically in FIG. 2. The terminals 142, 144, 162 164 are arranged in a circular array about the shafts 36, 38 in the second housing part 122. The terminals 142, 144, 162, 164 are preferrably circumferentially spaced thereabout an equal distance. The power terminals 142, 144 are disposed diametrically opposite one another, as are the switch terminals 162, 164.

Upon relative rotation between the input shaft 36 and the output shaft 38, the rocker arms 184a, 184b pivot to close one of its associated contacts 192 to selectively connect terminals 142, 144, with terminals 162, 164 and allow electrical current to flow to the motor 24. Specifically, when a rocker arm 184 pivots a predetermined amount as a result of a predetermined amount of relative rotation between the shafts 36, 38, a pair of contacts 192 engage and an electrical connection is made between the positive side of the power supply 140 and one terminal 150 or 152 of the motor. At the same time, the other rocker arm 184 pivots and a pair of its associated contacts 192 engage and an electrical connection is made between the ECU and hhe other one of the motor terminals 150, 152 to complete an electric circuit. The rocker arms 184a, 184b are pivoted simultaneously to close an electrical circuit between the power supply 140 and ECU 202 and the terminals 150, 152 of the electric assist motor 24. Depending upon the direction that the rocker arms 184 are pivoted, current flows in one of two possible directions through the motor 24. The rocker arms 184 are in a neutral, normally open position as illustrated in FIG. 6 when no steering torque is applied to the steering wheel 32.

Figure 7:
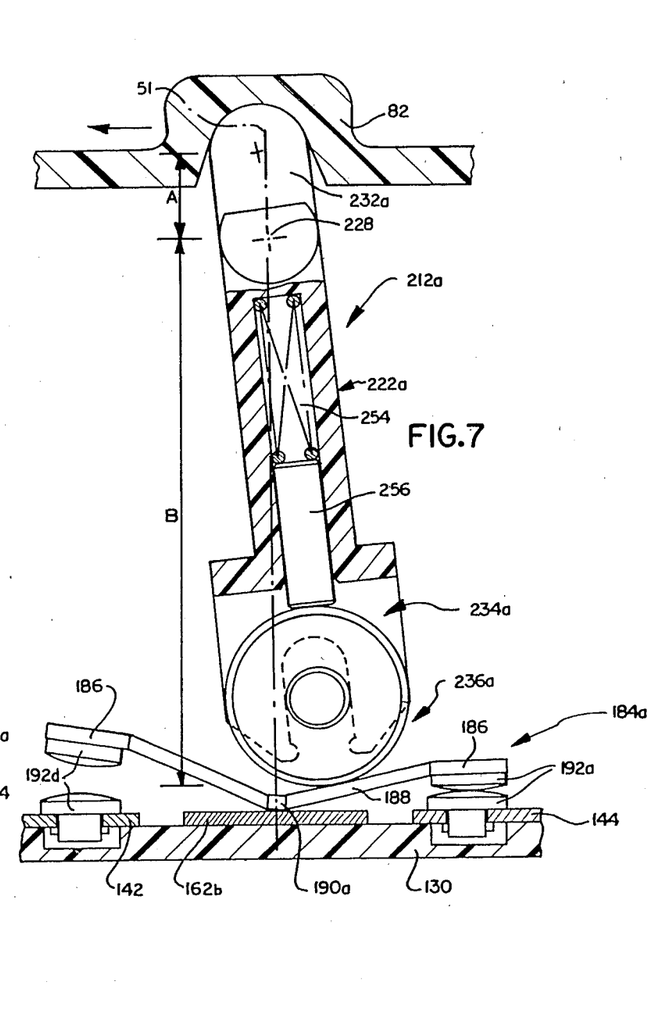
FIG. 7 is a view similar to FIG. 6 showing the parts in a different position.
Figure 9:
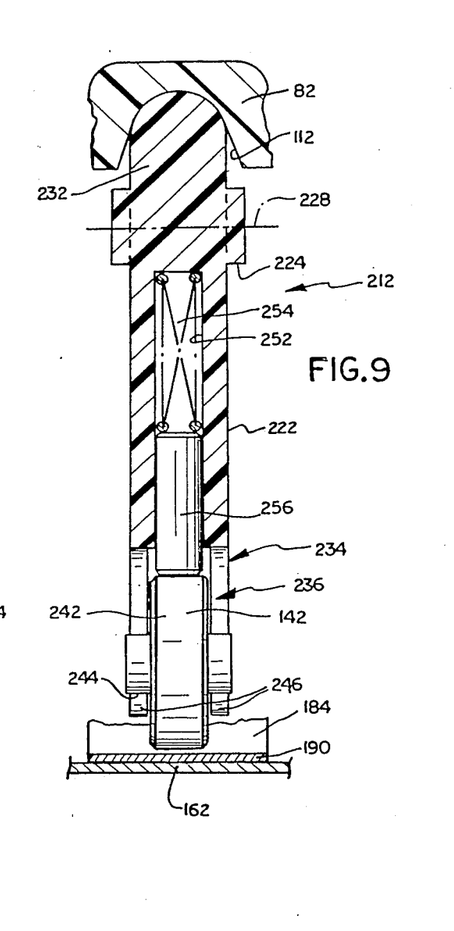
FIG. 9 is a side view, partly in section, taken approximately along the line 9—9 of FIG. 6.

In operation, assume steering torque is applied to the steering wheel 32 in a counterclockwise direction to steer left. The input shaft 36 and thus the first body portion 82 rotate counterclockwise relative to the output shaft 38. The first body portion 82 moves to the left relative to the second body portion 122, as viewed in FIG. 6. The pivoting arm 212a pivots about axis 228 to the position illustrated in FIG. 7. The pivoting action of the pivoting member 222a actuates the rocker arm 184a by the wheel 242 pushing against one of the legs 188. The two-point contact between the wheel 242 and the rocker arm 184a changes to a one-point contact upon the slightest degree of movement of the arm 212a. As the wheel 242 pushes against one of the legs 188, the rocker arm 184a pivots clockwise about the contact portion 190, as iiewed in FIGS. 6 and 7, to close contact pair 192a, as illustrated in FIG. 7, thereby permitting electrical current to flow between terminals 144 and 162. Concurrently, the second pivoting arm 212b actuates the other rocker arm 184b to close the contact pair 192c. Thus, electric current is permitted to flow between terminals 142 and 164.

Upon clockwise relative rotation of the input shaft 36 to the output shaft 38, the pivoting arms 212a, 212b pivot about axis 228 in the direction opposite that shown in FIG. 7. The pivoting action of the pivoting arms 212a, 212b actuate the rocker arms 184a, 184b to pivot and close contacts 192b and 192d. Thus, current is permitted to flow in another direction to the motor 24.

Once steering torque is removed from the steering wheel, the pivot arms rotate back to the neutral position shown in FIG. 6 where the wheel 242 makes two-point contact with the rocker arm 184.

Thus, contacts 192 of the reversing switch 80 are actuated to close a circuit between the terminals 142, 144, 162, 164 by relative rotation of the input and output shafts 36, 38. The reversing switch 80 controls the direction of applied electrical power to the power assist motor 24. Even after a contact pair is closed, the pivoting arms 212a, 212b may further pivot about the axis 228 because each of their wheel 242 will slide in their respective slot 246. The shafts 36, 38 are thereby able to continue relative rotation even after the switch contacts 192 close. The angular displacement of the pivoting arms 212a, 212b is limited by the interior faces 56 and the exterior faces 58 associated with the shafts 36, 38 described above. This arrangement permits switch closure prior to application of electrical power to the electric assist motor in a manner fully described in the above-incorporated '787 patent.

This invention has been described with reference to a preferred embodiment. Modifications and alterations may occur to one skilled in the art upon reading and understandigg this specification. It is our intention to include all such modifications and alterations insofar as they come within the scope of the appended claims.

Having described a specific preferred embodiment of the invention, the following is claimed:

1. A reversing switch for establishing electrical connections in response to torque applied across first and second coaxial shaft sections connected by a torsion bar, said applied torque causing said torsion bar to twist about its axis, said reversing switch comprising:
    first base portion fixed to said frist shaft section and second base portion fixed to said second shaft section, twisting of said torsion bar in response to said applied torque causing relative rotation to occur between said first and second base portion about the torsion bar axis in a direction dependent upon the direction of applied torque;
    actuatable contact means carried by said first base portion and responsive to a pivotable actuator for, when in a first condition, closing a first set of electrical contacts thereby making a first electrical connection and, when in a second condition, closing a second set of electrical contacts thereby making a second electrical connection and, when in a third condition, retaining said first and second sets of electrical contacts open; and
    pivotable actuator means having a first distal end portion received in a recess portion of said second base portion and a second distal end portion operatively contacting said actuatable contact means, said pivotable actuator means mounted radially outward of said torsion bar axis and pivotably mounted to said first base portion, relative rotation between said first and second base portions in first and second relative directions causing said pivotable actuator means to pivot in first and second directions, respectively, about a second axis transverse to the torsion bar axis, said pivotable actuator means controlling the condition of said actuatable contact means so as to be in said first condition when said pivotable actuator means pivots in its first pivotal direction upon application of torque across said first and second coaxial shaft sections in a first direction, and in said second condition when said pivotable actuator means pivots in its second pivotal direction upon appliation of torque across said first and second coaxial shaft sections in a second direction, and in said third condition when no torque is applied across said first and second coaxial shaft sections.

2. The reversing switch of claim 1 wherein said actuatable contact means includes two generally V-shaped rocker arms, each having its vertex pivotally contacting said first base portion, each distal end of said rocker arms carrying one electrical contact of a set of electrical contacts, each of said electrical contacts carried by said rocker arm having a cooperating electrical contact mounted to said first base portion and wherein said pivotable actuator means includes a pivot arm mounted to said first base portion so that said second transverse axis is its pivotal axis, said pivot arm pivoting in response to relative rotation between said first and second body portions, each of said rocker arms having an associated pivot arm, each pivot arm having a wheel slidably mounted near its second distal end and resiliently biased against its associated rocker arm, pivotal movement of said pivot arm controlling closing or opening of said electrical contact sets.

3. The reversing switch of claim 2 wherein the diameter of each wheel is related to the angle between leg portions of its associated V-shaped rocker arm such that when the pivot arms are positioned to retain the electrical contacts open, the wheels contact each leg of their associated v-shaped rocker arm.

4. The reversing switch of claim 1 wherein said pivotable actuator means includes a first portion located between said first distal end portion and said second axis and a second portion located between said second axis and said second distal end portion, the length of the first portion of said pivotable actuator means not being equal to the length of the second portion of said pivotable actuator means.

5. The reversing switch of claim 4 wherein said length of said first portion of said pivotable actuator mean is less than said length of said second portion of said pivotable actuator means so as to multiply an effective pivot angle of said pivotable actuator means relative to rotational angle between said first and second base portions.

6. An electrical switching mechanism which is opperative in response to applied torque across a rotatable shaft, the applied torque causing the shaft to twist about it axis, said, switch mechanism comprising:
 first and second base portions fixed at spaced apart locations on said shaft, twist of the shaft caused by applied torque occurring between said spaced apart locations;
 actuator means, including a pivot arm pivotally mounted to said first base portion and having a first distal end received in a recess of said second base portion and having a roller at its second distal end, said pivot arm pivoting in response to relative rotation between said first and second base portions when said shaft twists;
 electrical contact means including pairs of normally open contacts, one electrical contact of appair of contacts carried by a rocker arm and its associated electrical contact mounted to said first base portion, said roller of said pivot arm contacting said rocker arm so that pivotal movement of said pivot arm close at least one pair of electrical contacts of said electrical contact means.

7. The switching mechanism of claim 6 wherein said rocker arm is generally V-shaped having its vertex pivotally contacting said first base portion, said roller being resiliently biased against said rocker arm.

8. The switching mechanism of claim 7 wherein said roller has a diameter related to an angle between legs of said rocker arm such that when no electrical contact pairs are closed, said roller contacts both legs of said rocker arm.

9. The switching mechanism of claim 7 wherein said pivot arm has a pivot axis transverse to the axis of said shaft.

10. Torque sensitive switch apparatus, comprising:
 first and second coaxial shaft sections connected together by a torsion bar, said first and second shafts being rotatable relative to one another upon the application of torque thereacross, said torque causing said torsion bar to twist;
 first and second base portions fixed respectively to said first and second shaft sections;
 lever means having a first part pivotably coupled to said first base portion, a second part received in a recess in said second base portion, and a third part adapted to receive a roller;
 a roller rotatably mounted to said third part of said lever means, said roller rolling along a path relative to said second base portion upon relative rotation between said first and second shaft sections; and
 contact means disposed along said path and including a plurality of normally open electrical contact pairs being actuatable to a closed condition by said roller;
 whereby, upon relative rotation between said first and second shafts, said lever means pivots, said roller rolls over said contact means, and actuates contact pairs closed.

11. The switch apparatus of claim 10 wherein said contact means includes a generally V-shaped rocker arm pivotally contacting said second base portion and carrying a portion of an electrical contact pair at each of its distal ends, each of said portions of an electrical contact having a cooperating contact mounted to said second base portion, the roller being resiliently biased against said rocker arm.

12. The switch apparatus of claim 11 wherein said roller has a diameter related to an angle between legs of said rocker arm such that when no electrical contact pairs are closed, said roller contacts both legs of said rocker arm.

13. The switch apparatus of claim 10 wherein said lever has a pivot axis transverse to the axis of said shaft sections.

14. A switch for controlling the application of electrical power to an electric motor, said switch comprising:
 first and second parts coaxially located at spaced apart locations and resiliently connected together for relative rotation therebetween in first and second opposite directions about their common axis, the common axis being a first axis;
 actuatable contact means including a plurality of normally open contact pairs for connecting the electric power to the motor in one direction upon relative rotation of said first and second parts in said first direction and in an opposite direction upon relative rotation of said first and second parts in said second direction; and
 actuating means for actuating said contact means upon relative rotation of said first and second parts, said actuating means including at least one pivoting means located radially outwardly of the first axis and pivotable about a second axis transverse to the first axis, said pivoting means including a support portion supported for pivotal movement about the second axis by said second part, a first portion having a distal end at a first distance from the second axis and received in a recess of said first part so as to effect pivotal movement of said pivoting means upon relative rotation of said first and second parts, a second portion having means for actuating certain of said contact pairs closed upon pivotal movement of said pivoting means and located at a second distance from the second axis.

15. The switch as set forth in claim 14 wherein the second distance is greater than the first distance.

16. A switch as set forth in claim 14 wherein said first portion of said pivoting means is disposed coaxial with said second portion of said pivoting means and said support portion is disposed therebetween.

17. A switch as set forth in claim 16 further including an arm supporting a portion of said contact means for pivotal movement; and
said second portion includes a wheel supported for rotational and axial movement relative to said second portion, said wheel being biased into engagement with said arm, pivotal movement of said pivoting means pivoting said arm to actuate said contact means.

18. A switch as set forth in claim 14 wherein the ratio of the second distance to the first distance is at least 2 to 1.

19. A switch as set forth in claim 14 wherein said contact means is electrically connected with the electric motor and a source of electrical power to selectively control the direction of current flow to the motor upon actuation of said contact means in response to the direction of relative rotation of said first and second parts.

20. A switch for controlling the application of electrical power to an electric motor, said switch comprising:
first and second parts which are relatively rotatable with respect to one another in first and second opposite directions about a common axis;
actuatable contact means carried by said first part for connecting the electric power to the motor in one direction upon relative rotation of said first and second parts in said first direction and in an opposite direction upon relative rotation of said first and second parts in said second direction;
actuating means for actuating said contact means upon relative rotation of said first and second parts, said actuating means including at least one pivoting means located radially outwardly of the common axis and pivotable about a second axis transverse to said common axis;
said contact means being electrically connected with the electric motor and a source of electrical power to selectively control the directon of current flow to the motor upon actuation of said contract means in response to the direction of relative rotation of said first and second parts;
said pivoting means including a support portion supported for pivotal movement about the second axis by said second part, a first portion engageable with said first part at a first distance from the second axis to effect pivotal movement of said pivoting measns upon relative rotation of said first and second parts, a second portion having means for actuating said contact means upon pivotal movement of said pivoting means and located at a second distance from the second axis;
four terminals disposed circumferentially about the first axis, a first one of said terminals being electrically connected with the motor, a second one of said terminals being electrically connected with the motor, a third one of said terminals being electrically connected to one terminal of the source of electrical power, a fourth one of said terminals being electrically connected to the other terminal of the source of electrical power; and
said contact means includes a plurality of contact pairs, each of said contact pairs having one contact which is supported oor pivotal movement by said pivot means, said plurality of contact pairs being selectively actuatable to move from a normally open condition (i) to a first condition which electrically connects said first and third terminals and which electrically connects said second and fourth terminals and (ii) to a second condition which electrically connects said first and fourth terminals and which electrically connects said second and third terminals.

21. A switch as set forth in claim 20 wherein said means for actuating said contact means includes a pair of rocker arms, each of said rocker arms having a V-shaped portion connecting two arm portions, each arm portion having a contact supported for pivotal movement disposed thereon, each of said rocker arms having said V-shaped portion electrically connected with a respective one of said terminals connected with the motor and pivotal relative to said respective terminal.

22. A switch as set forth in clamm 21 wherein said means for actuating said contact means includes a pair of pivoting means located radially outward of said first axis and diametrically opposite one another, each of said pair of pivoting means being supported for pivotal movement about the second axis, each of said pair of pivoting means having a portion with means for engaging said one of said rocker arms to pivot said rocker arm to actuate said contact means to said first and second conditions upon pivotal movement of said pivoting means.

23. A switch as set forth in claim 22 wherein each of said pivoting means further includes another portion which is engageable within a recess of said first part of effect pivotal movement of said pivoting means upon relative rotation of said first and second parts.

24. An apparatus for controlling the application of electric power to an electric motor which is drivingly connected with a steering member of a vehicle, said apparatus comprising:
a first body portion fixed to an input shaft and supported for rotation about a first axis, said input shaft being connectable with the vehicle steering wheel;
a second body portion fixed to an output shaft and supported for rotation about the first axis, said output shaft drivingly connected with a vehicle steering member, said input shaft and said output shaft being connected by a torsion bar, applied steering torque causing said torsion bar to twist, said second body portion and said first body portion rotating relative to each other about said first axis in first and second opposite directions depending on the direction of applied steering torque;
actuable means for effecting the flow of electric current to the motor in one direction in response to relative rotation between said first and second body portions in said first direction and to effect the flow of electric current to the motor in another opposite direction in response to relative rotation between said first and second body portions in said second direction, said actuatable means including four terminals disposed circumferentially about the first axis, a first one of said terminals being electrically connectable with the motor, a second one of said terminals being disposed diametrically opposite said first terminal and electrically connectable with the motor, a third one of said terminals being electrically connectable with a first connector of the power source, a fourth one of the terminals being disposed diametrically opposite said third terminal and electrically connectable to a second connector of the power source, said actuatable means also including normally open plurality of pairs of fixed and movable contacts disposed between adjacent pairs of said terminals, at least two plurality of said pairs of contacts having their respective movable contacts being pivotally supported by respective arms of rockable contact members disposed on the motor terminals and closable against associated fixed contacts carried by the power source terminals upon actuation to permit electric current to flow in one direction to the motor in response to relative rotation between said first and second body portions in said first direction and to permit electrical current to flow in an opposite direction to the motor in response to relative rotation between said first and second body portions in said second direction; and means for selectively actuating said contact pairs in response to relative rotation between said first and second body portions, said means for selectively actuating said contacts includes a pair of pivoting means located radially outward from the shafts, each of said pivoting means being supported by said second body portion for pivotal movement about a second axis which is transverse to the first axis, each of said pivoting means having a first end portion for engaging a respective recess in said first body portion and having a second portion for engaging as associated one of said arms carrying said rockable contact members to pivotally move said movable contacts to close against associated fixed contacts upon relative rotation between said first and second body portions.

* * * * *